United States Patent [19]

Finnegan

[11] Patent Number: 5,027,520
[45] Date of Patent: Jul. 2, 1991

[54] FARRIER'S INSTRUMENT

[76] Inventor: Danny E. Finnegan, 6840 Hickory Ave., Orangevale, Calif. 95662

[21] Appl. No.: 568,245
[22] Filed: Aug. 15, 1990
[51] Int. Cl.⁵ ............................................. A01L 11/00
[52] U.S. Cl. ...................................... 33/195; 33/511
[58] Field of Search .................. 33/195, 511, 415, 534

[56] References Cited

U.S. PATENT DOCUMENTS

| | | | |
|---|---|---|---|
| 70,307 | 10/1867 | Woodward | 33/195 |
| 82,214 | 9/1868 | Ferren | 33/195 |
| 82,215 | 9/1868 | Ferren | 33/195 |
| 583,706 | 6/1897 | Kearns et al. | 33/195 |
| 832,060 | 10/1906 | Holmquist | 33/195 |
| 4,227,311 | 10/1980 | Behney | 33/195 |
| 4,394,801 | 7/1983 | Thibodeaux | 33/471 |
| 4,831,148 | 3/1989 | Finnegan | 33/195 |

FOREIGN PATENT DOCUMENTS 1815 of 1867 United Kingdom .................. 33/195

*Primary Examiner*—Thomas B. Will
*Attorney, Agent, or Firm*—Donald E. Nist

[57] ABSTRACT

The farrier's instrument includes a vertical rod, preferably with an elongated marking slot therein, a spaced pair of horizontal plates slideably connected to the vertical rod through the slot and lockable in place, and a rear rod, the upper end of which is pivotably connected to the upper end of the vertical rod, and which extends downwardly and rearwardly therefrom at an acute angle. The upper end of the rear rod is expanded and defines a slot in which a pointer connected to the upper end of the vertical rod extends for marking the exact angle between the two rods, by reference to indicia lining the slot. Preferably the pointer acts as a limit bar, and a spring is connected to the rear rod for biasing it toward the vertical rod. The plates may include indicia to measure the medial/lateral assymmetry of a horse's hoof. The instrument is used by turning over a horse's hoof, marking the vertical midline of the hoof with the vertical rod after positioning the rear rod against the front of the hoof, and measuring the medial/lateral assymmetry.

5 Claims, 2 Drawing Sheets

FARRIER'S INSTRUMENT

BACKGROUND OF THE INVENTION

1. Field of the Invention

The present invention generally relates to instruments and more particularly to an improved instrument for measuring the medial/lateral symmetry of a horse's hoof.

2. Prior Art

Horseshoeing is considered an art rather than a science since traditionally the bottom of a horse's foot is merely eyeballed by the horseshoer (farrier) in order to determine how flat it is and in what plane. Thereafter, the farrier makes any corrections by peeling, cutting, filing or otherwise removing part of the bottom of the hoof before nailing the horseshoe in place against the corrected bottom of the hoof. However, errors are frequent and can lead to wear of the horseshoe and damage to the horse's leg and foot.

It is particularly important to be able to measure the extent of side to side balance of the horse's foot. This is technically referred to as the medial/lateral balance. Any imbalance detected must be corrected so that the foot strikes the ground flat and balanced. A balanced foot assures that there will be optimum support up through the rest of the leg's bony column. A foot that is in medial/lateral balance will help align the horse's joints, thus exposing them to less stress, rotation and deviation and provide them with optimum flexion. Medial/lateral balance is very difficult to detect and correct merely by eyeballing.

Although the instrument of U.S. Pat. No. 4,813,148 helps to determine the flatness of a horse's hoof and to make corrections therein, there remains a need for an instrument which will precisely and simply determine medial/lateral balance and enable the farrier to correct any imbalance with precision. Such a device should be simple, accurate, easy to build and use, and also should be durable and inexpensive.

SUMMARY OF THE INVENTION

The improved farrier's instrument of the present invention satisfies all the foregoing needs. The instrument is substantially as set forth in the Abstract of the Disclosure.

Thus, the farrier's instrument comprises a vertical rod, preferably with a central slot the length thereof for marking the vertical midline of a horse's hoof when the hoof is turned over. A spaced pair of horizontal plates are slideably connected to the vertical rod through the slot and are lockable in place at any desired position. Each of the plates extends laterally from opposite sides of the vertical rod and preferably includes indicia for measuring the exact amount of medial/lateral asymmetry of a horse's hoof.

The upper end of the vertical rod is pivotably connected to the expanded upper end of a rear rod which extends downwardly and rearwardly therefrom at an acute angle. The expanded upper end of the rear rod includes a slot in which a pointer connected to the upper end of the vertical rod is disposed for marking the exact angle between the two rods by reference to indicia lining the slot. Preferably, the pointer also acts as a limit bar, and a spring is connected to the rear rod biasing it toward the vertical rod.

The instrument is used by turning over a horse's hoof, marking the vertical midline of the hoof with the vertical rod after positioning the rear rod against the front of the hoof, and then measuring the exact amount of deviation from medial/lateral symmetry by reference to indicia on the horizontal plates which abut the hoof. Once the vertical midline is drawn on the hoof through the slot in the vertical rod, the instrument can be put aside and the farrier can begin trueing up the hoof, with periodic checks for symmetry by reuse of the instrument. The instrument allows very rapid and precise corrections to be made so that the hoof becomes flat, balanced in all directions and in perfect condition for shoeing.

Further features of the improved instrument of the present invention are set forth in the following detailed description and accompanying drawings.

DRAWINGS

DETAILED DESCRIPTION

FIGS. 1-6.

Figure 1:
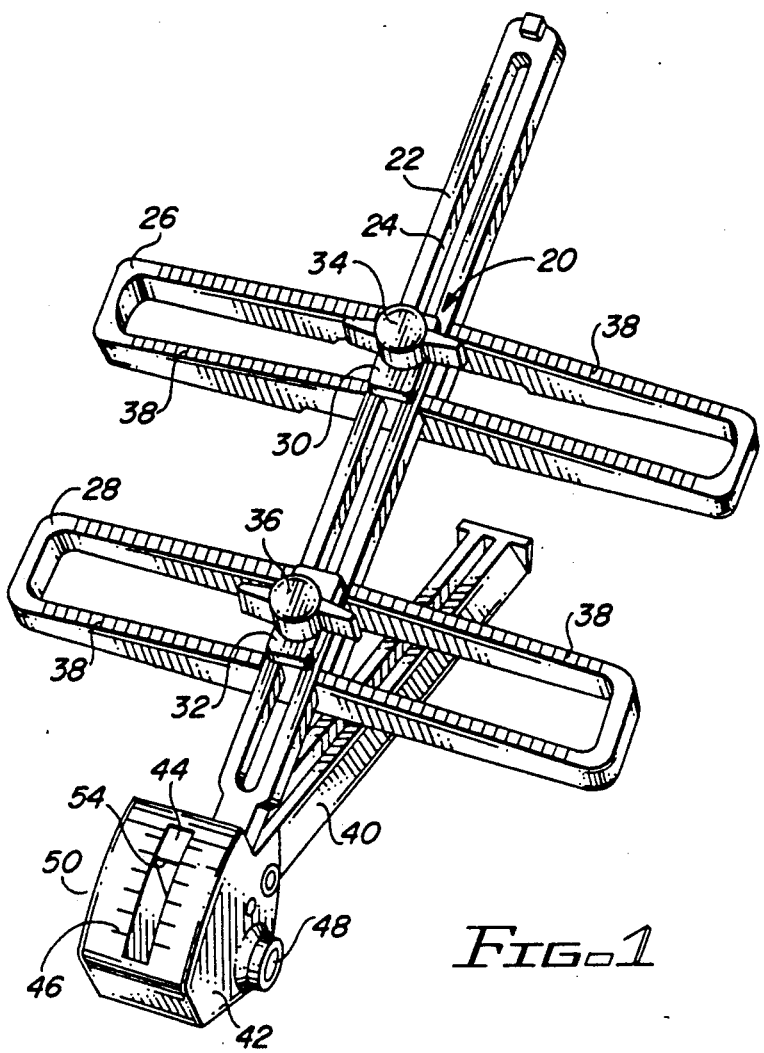
FIG. 1 is a schematic perspective view of a preferred embodiment of the improved farrier's instrument of the present invention.
Figure 4:
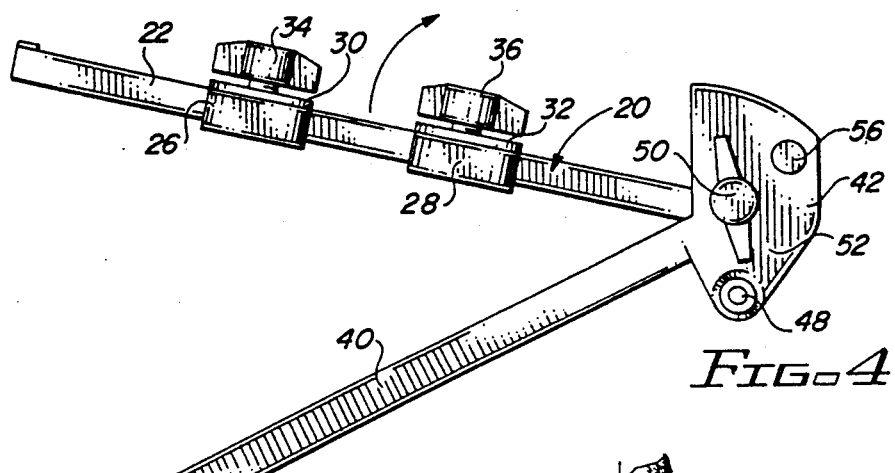
FIG. 4 is a schematic side perspective view of the instrument of FIG. 1.
Figure 6:
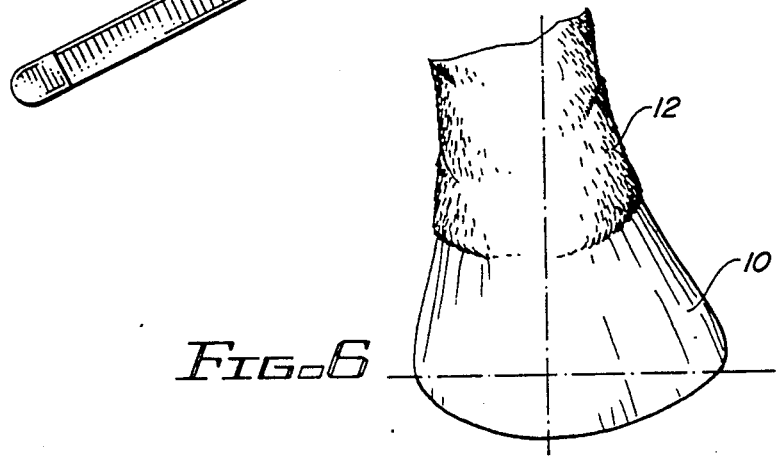
Figure 5:
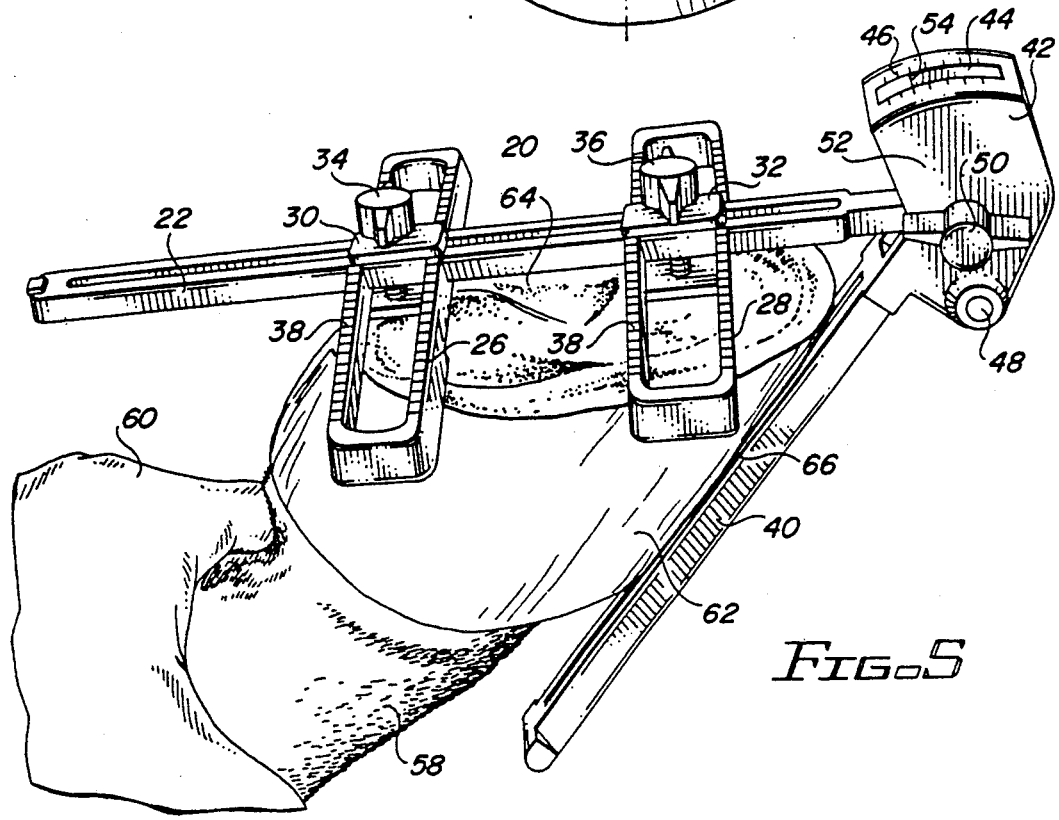
FIG. 5 is a schematic side perspective view of the instrument of FIG. 1 shown in place on a horse's hoof during measurement thereof; and, FIG. 6 is a schematic front perspective view of a horse's hoof which exhibits badly imbalanced medial/lateral symmetry.

Now referring more particularly to FIGS. 1, 4 and 5, a preferred embodiment of the improved farrier's instrument of the present invention is schematically depicted therein. The instrument is used to detect and enable a farrier to correct a medial/lateral asymmetry in a horse's hoof such as is illustrated in FIG. 6. Thus, FIG. 6 shows a horse's hoof 10 suffering from drastic medial/lateral imbalance, so that the hoof 10 is out of vertical alignment with the leg 12, which will almost inevitably cause limping and structural damage to the horse.

Figure 2:
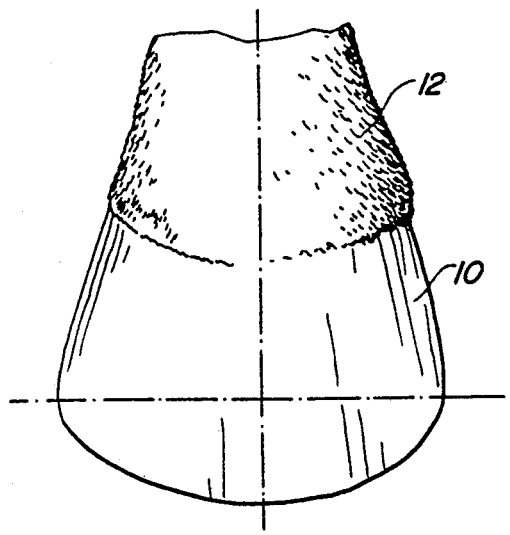
FIG. 2 is a schematic front perspective view of a horse's hoof which has proper medial/lateral symmetry.
Figure 3:
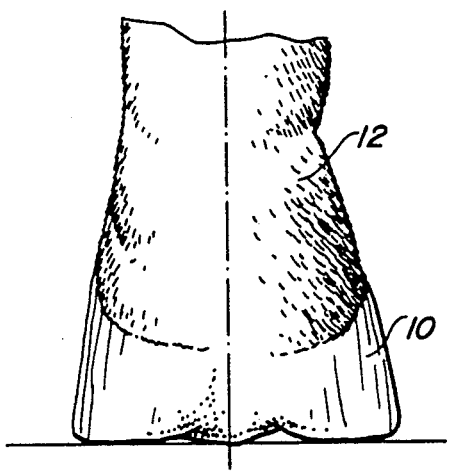
FIG. 3 is a schematic rear elevation of the hoof of FIG. 2.

It is an object of the present invention to provide an instrument which will measure the extent of such medial/lateral asymmetry and readily enable the farrier to correct it so that the corrected hoof will have the appearance of the hoof shown in FIGS. 2 and 3. With such a correction, the horse's hoof and leg come into perfect vertical alignment and there is no danger of injury to the horse.

A preferred embodiment of the instrument which enables the farrier to accurately and rapidly determine medial/lateral symmetry is schematically depicted in FIGS. 1, 4 and 5. Thus, instrument 20 is shown which comprises an elongated, flat vertical rod 22 of metal, wood, ceramic, plastic or the like, preferably metal, and which has an elongated central slot 24 throughout substantially the length thereof.

Instrument 20 is shown in an inverted position in FIG. 1. It includes a spaced pair of horizontal, transversely extending plates 26 and 28 slideably connected to rod 22 through slot 24, conventional lock plates 30 and 32, respectively, and releasable winged lock nuts 34 and 36, respectively connected to plates 26 and 28. In each instance the lock plates can be tightened against rod 22 to releasably hold the respective plates 26 and 28 in any desired location along the length of rod 22. The upper surfaces of plates 26 and 28 are marked with measuring marks 38 so that the exact amount of medial/lateral asymmetry in a horse's foot can be visually and instantly determined, once instrument 20 is in place on the hoof as hereinafter set forth.

Instrument 20 also includes a rear rod 40, the upper end of which is formed into an expanded head 42 bearing a slot 44. The sides of head 42 defining slot 44 bear spaced measuring marks 46. The upper end of rod 22 is inserted into head 42 and pivotally connected thereto as by cross bolt 48. In the operative position shown in FIG. 5, rod 40, which may be of metal, wood, ceramic or plastic, preferably metal, extends rearwardly and downwardly from rod 22.

A winged locking screw 50 passes through the side 52 of head 42 into contact with rod 22 to releasably lock it in place, when desired. Rod 22 bears a pointer 54 which protrudes into slot 44 to indicate the angles between rods 22 and 40. Preferably, rod 40 is biased toward rod 22 by a spring 56 disposed in head 42 in slot 44 between the top of slot 44 and pointer 54.

When it is desired to utilize instrument 20, the farrier grips the horse's ankle 58 with his hand 60 and inverts the hoof 62 so that the bottom 64 is exposed. Instrument 20 is then positioned so that rod 40 abuts the front 66 of hoof 62. Rod 22 is positioned along the vertical centerline of hoof 62 from the bottom to the top thereof, as shown in FIG. 5, with plates 26 and 28 spaced along the length of hoof 62.

A vertical centerline can be marked on hoof 62 by a marking pen or pencil through slot 24 for easy reference when instrument 20 is removed from hoof 62. The extent of deviation from perfect medial/lateral symmetry can be noted by reading the markings 38 on plates 26 and 28 and by sliding plates 26 and 28 to desired positions along rod 22, releasably locking them in place.

As the farrier proceeds to bring the hoof 62 to perfect symmetry, his work can be checked from time to time by reapplying instrument 20 to hoof 62. The angle between the front 66 of hoof 62 and the bottom thereof can be locked into place by screw 50 and can be read on scale 46 by reference to pointer 54. Thus, instrument 20 allows precise measurements to be made on hoof 62 before, during and after corrective farrier work thereon.

The present farrier instrument is simple precise, easy to use, durable and inexpensive. Various modifications, changes, alterations and additions can be made in the improved instrument of the present invention, its components and parameters. All such modifications, changes, alterations and additions as are within the scope of the appended claims form part of the present invention.

What is claimed is:

1. An improved farrier's instrument for measuring the medial/lateral and symmetrical balance of a horse's foot, said instrument comprising, in combination:
    a) an elongated vertical rod defining a central elongated slot through which the vertical line of said horse's foot can be marked, said vertical rod being for alignment along the vertical midline of said horse's foot with the foot turned over;
    b) a spaced plurality of horizontal plates slideably connected to and releasably locked to said vertical rod, each said plate extending outwardly from the opposite sides of said vertical rod and bearing indicia for measuring the lateral symmetry of said horse's foot, said plates being adapted for abutting said horse's foot when said foot is turned over; and,
    c) a rear rod pivotably connected at its upper end to the upper end of said vertical rod and extending rearwardly and downwardly therefrom at an acute angle, said rear rod being adapted to abut the front of said horse's foot when the foot is turned over and said vertical rod is aligned along the vertical midline of said foot, said vertical rod upper end and said rear rod upper end each bearing means for indicating the angle between said two rods.

2. The improved farrier's instrument of claim 1 wherein the upper end of said vertical rod bears a pointer and wherein the upper end of said rear rod is expanded and defines a slot through which said pointer extends and wherein the sides of said expanded end defining said slot bear angle-measuring indicia.

3. The improved farrier's instrument of claim 2 wherein said expanded portion of said upper end of said rear rod includes spring means biasing said rear rod towards said vertical rod and said pointer functions as limit means for operation of said rear rod relative to said vertical rod.

4. The improved farrier's instrument of claim 1 wherein said instrument includes means for releasably locking the angle between said vertical rod and said rear rod.

5. The improved farrier's instrument of claim 1 wherein each of said plates bears an elongated central slot and locking means for releasably locking said plate against said vertical rod.

* * * * *